United States Patent
Ben-Horin (10) Patent No.: US 7,527,306 B2
(45) Date of Patent: May 5, 2009

(54) PIPE COUPLING

(75) Inventor: Raanan Ben-Horin, Kibbutz Beit-Zera (IL)

(73) Assignee: Arkal Filtration Systems C.S. Ltd. (IL)

( * ) Notice: Subject to any disclaimer, the term of this patent is extended or adjusted under 35 U.S.C. 154(b) by 78 days.

(21) Appl. No.: 10/516,447

(22) PCT Filed: May 30, 2002

(86) PCT No.: PCT/IL02/00427

§ 371 (c)(1),
(2), (4) Date: Nov. 29, 2004

(87) PCT Pub. No.: WO03/102458

PCT Pub. Date: Dec. 11, 2003

(65) Prior Publication Data

US 2005/0225089 A1    Oct. 13, 2005

(51) Int. Cl.
    *F16L 23/00*    (2006.01)
(52) U.S. Cl. .................. 285/414; 285/108; 285/113; 285/339; 285/368; 285/412
(58) Field of Classification Search ............... 285/113, 285/108, 368, 363, 405, 412, 413, 414, 910, 285/917, 337, 314, 315, 104, 196, 111, 322, 285/411, 415, 339; 277/620, 627, 608, 609, 277/616, 619, 623, 624, 625, 626, 314, 611
See application file for complete search history.

(56) References Cited

U.S. PATENT DOCUMENTS

| | | | | | |
|---|---|---|---|---|---|
| 1,365,530 | A | * | 1/1921 | Moore | 277/620 |
| 1,556,745 | A | * | 10/1925 | Banta | 285/374 |
| 1,821,867 | A | * | 9/1931 | Wilson | 285/334.2 |
| 1,942,489 | A | * | 1/1934 | Pfefferle | 277/631 |
| 1,976,589 | A | * | 10/1934 | Trickey | 277/626 |
| 1,984,806 | A | * | 12/1934 | Pfefferle | 277/618 |
| 2,531,922 | A | * | 11/1950 | Seamark | 285/342 |
| 2,779,610 | A | * | 1/1957 | Risley | 285/323 |
| 2,786,697 | A | * | 3/1957 | Rescheneder | 277/615 |
| 3,124,502 | A | * | 3/1964 | Radke | 428/66.4 |
| 3,284,112 | A | * | 11/1966 | Martin | 285/328 |
| 3,381,983 | A | * | 5/1968 | Hanes | 285/321 |
| 3,652,110 | A | * | 3/1972 | Manton | 285/328 |

(Continued)

OTHER PUBLICATIONS

Notification of Transmittal of International Preliminary Examination Report, International Application No. PCT/IL 02/00427, Dec. 20, 2002.

*Primary Examiner*—James M Hewitt
*Assistant Examiner*—Jay R Ripley
(74) *Attorney, Agent, or Firm*—Blakely, Sokoloff, Taylor & Zafman (57) ABSTRACT

A pipe coupling for connecting a pipe to a flange associated with another pipe in a sealed manner. The pipe (10) is formed with circumferential groove (10a). The coupling comprises a gasket (20), a mounting ring (18), and a mounting flange (22). The ring (18) is elastically expandable, e.g. by being split, and formed with projecting rib (18a) adapted to fit into the groove (10a) and hold the ring affixed to the pipe (10). The mounting flange (22) is tightened against both the ring (18) and a counter-flange (12), through matching cone-shaped surfaces (18c, 22a).

17 Claims, 8 Drawing Sheets

U.S. PATENT DOCUMENTS

| | | |
|---|---|---|
| 3,761,114 A | 9/1973 | Blakeley |
| 3,861,722 A * | 1/1975 | Kenyon ........................ 285/337 |
| 3,963,298 A * | 6/1976 | Seiler ........................... 277/625 |
| 4,101,112 A * | 7/1978 | Conners et al. ............. 251/148 |
| 4,488,741 A * | 12/1984 | Conley et al. ............... 285/250 |
| D284,022 S * | 5/1986 | Milot et al. ................. D23/265 |
| 5,092,636 A * | 3/1992 | Judge .......................... 285/349 |
| 5,779,285 A * | 7/1998 | Robison ...................... 285/337 |
| 6,367,803 B1 * | 4/2002 | Loth ............................ 277/321 |
| 6,394,507 B1 * | 5/2002 | Baker .......................... 285/368 |

\* cited by examiner

PIPE COUPLING

The present patent application is a non-provisional application of International Application No. PCT/IL02/00427, filed May 30, 2002.

FIELD OF THE INVENTION

The present invention relates to pipe couplings of the type adapted to sealingly connect a pipe to a flange of a vessel or the like, or to connect two ends of pipes extending co-axially one with respect to the other.

BACKGROUND OF THE INVENTION

The most popular pipe coupling presently used for the above purposes is of the type known as hingeable split collar. It comprises a matched pair of half-circular collars hinged to each other at one end and provided with lugs at the other end. The collars are formed with rims or shoulders adapted to fit into and hold against complementary circumferential grooves formed near the ends of the pipes. An elastomeric circular gasket is used, surrounding the space between and partly extending over the pipe ends. Once the collars are tightened to each other, by a bolt passing through the respective lugs overlying each other, the gasket becomes compressed to provide a seal between the pipes.

Pressure admitted into the pipes is effective to enhance the sealing effect by further pressurizing of the gasket against the rims of the collars.

These split collar couplings are inherently inconvenient for use, demanding certain manipulation and application of physical force during the initial mounting stage.

Other deficiencies of the conventional couplings are that they need to be made of metal, and hence they are heavy and wasteful in terms of storage and transportation space.

It is the prime object of the present invention to provide a pipe coupling of simple, plastic molded integral construction, and allowing a wide range of variations satisfying different pipe-work conditions.

It is a further object of the invention to make use of the standard grooved pipe ends as applied in conjunction with the split collar couplings.

SUMMARY OF THE INVENTION

Provided according to the invention is a pipe coupling for connecting a pipe to a flange associated with another pipe in a sealed manner, wherein the pipe is formed with a circumferential groove the coupling comprising a gasket, a mounting ring, and a mounting flange, characterized in that the ring is elastically expandable, and formed with projection means adapted to fit into the groove and hold the ring affixed to the pipe while the mounting flange is tightened against both the ring and a counter-flange.

BRIEF DESCRIPTION OF THE DRAWINGS

These and additional constructional features and advantages of the invention will be more clearly understood in the light of the ensuing description of several preferred embodiments thereof, given by way of example only with reference to the accompanying drawings, wherein—

DETAILED DESCRIPTION OF THE PREFERRED EMBODIMENT

Referring to FIGS. 1-5, there is shown a pipe 10 coupled to a flange 12 by a series of bolts 14. The flange 12 may be welded or otherwise form part of, for example, a fluid vessel (not shown) via a pipe section 16.

Figure 1:
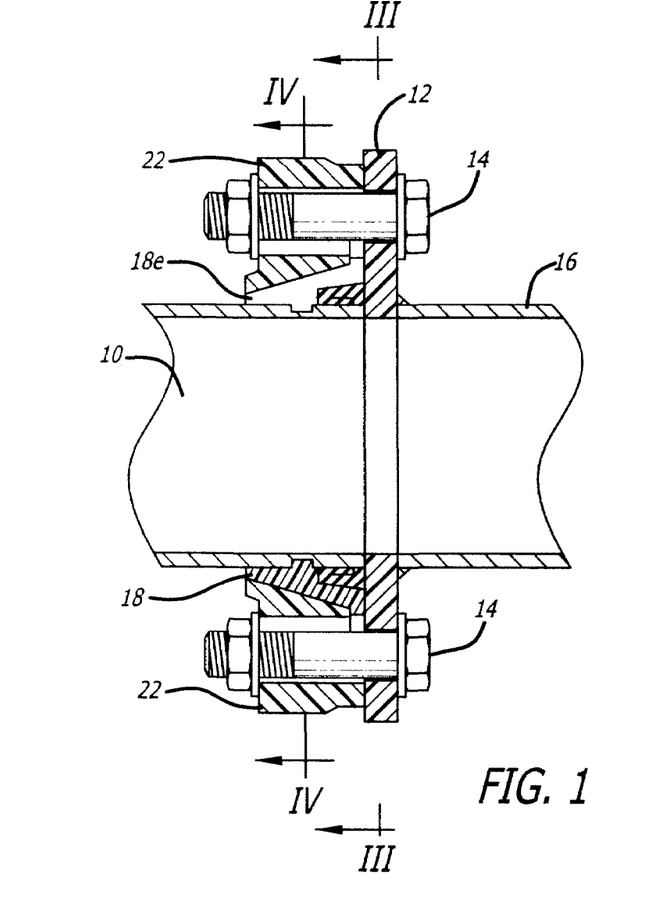
FIG. 1 is a cross-sectional view of a pipe coupling featuring the characteristics of the present invention as used for connecting a pipe to an outlet/inlet flange of a fluid vessel.
Figure 5:
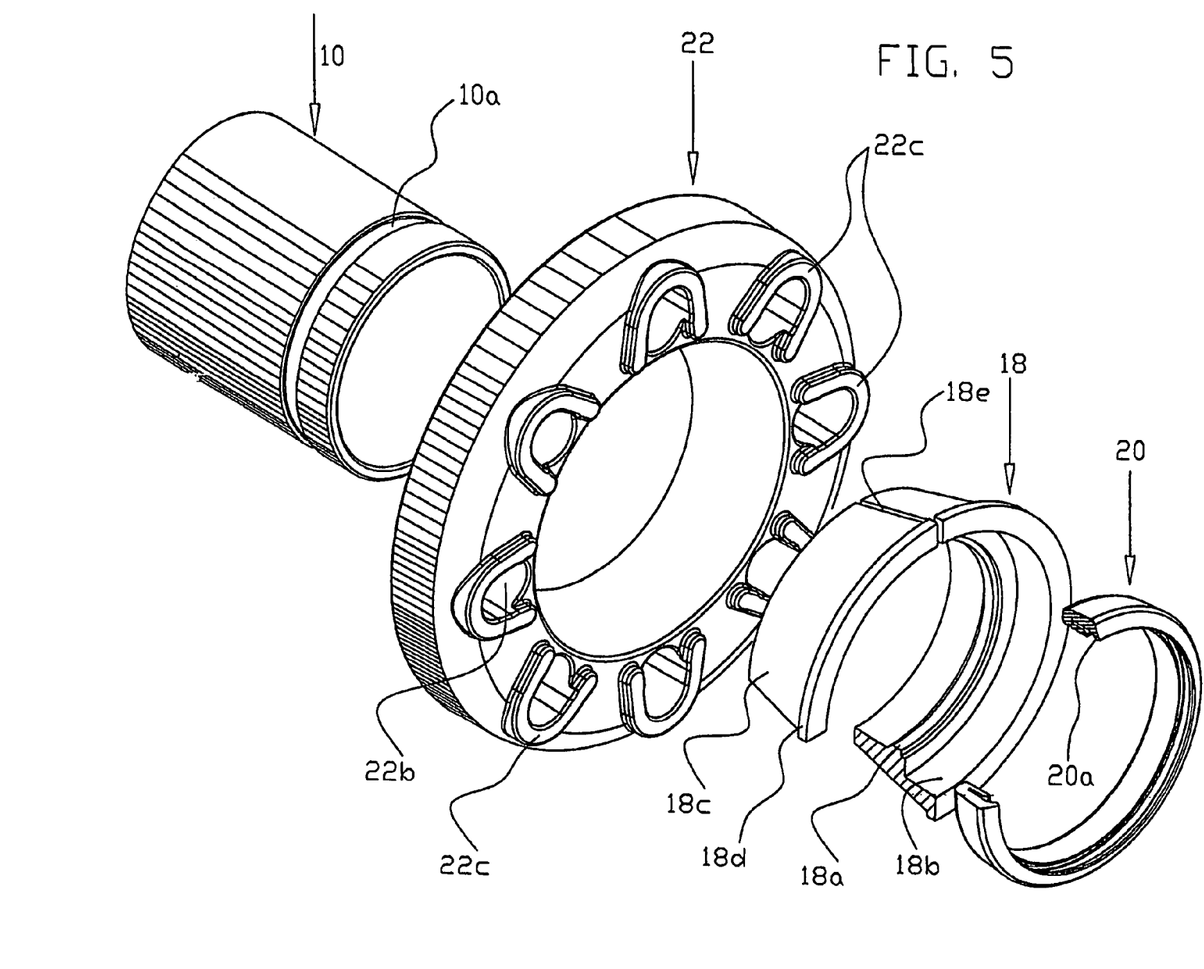
FIG. 5 is a perspective exploded view of the pipe coupling of FIG. 1.

The coupling comprises three parts: a split mounting ring 18; an elastomeric gasket ring 20; and a mounting flange 22.

Figure 2:
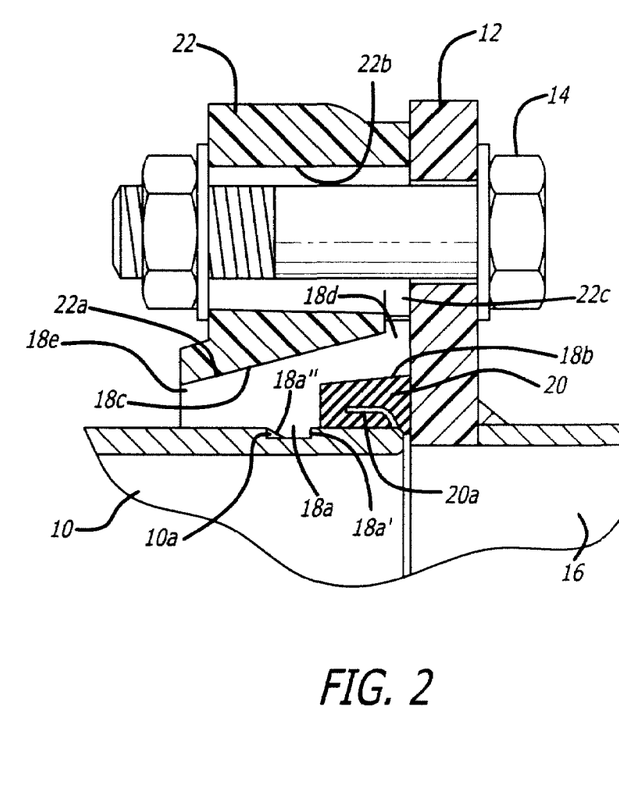
FIG. 2 shows a detail of the coupling of FIG. 1 on an enlarged scale.
Figure 3:
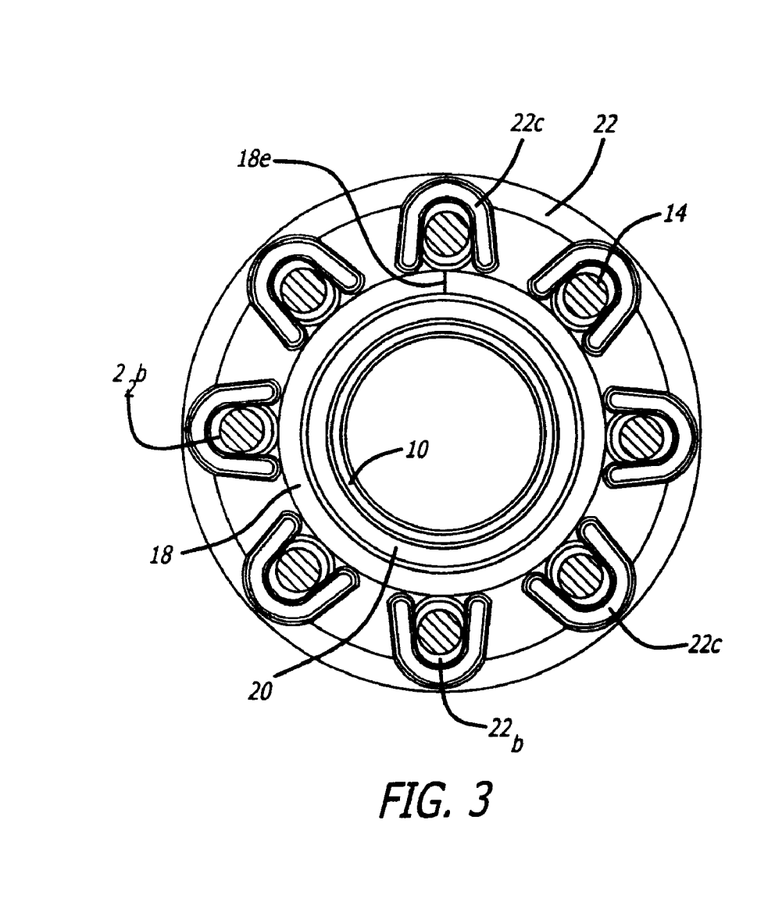
FIG. 3 is a sectional view taken along line III-III of FIG. 1.

As more clearly seen in FIGS. 2 and 5, the pipe 10 is formed with a circumferential groove 10a similar to that used in connection with the conventional hingeable collar couplings.

The split mounting ring 18 is typically made of plastics, and formed with a circular rib 18a configured to fit into the groove 10a.

The rib 18a is preferably of a generally saw-tooth shape (see FIG. 2), whereby the leading side 18a' thereof exactly matches the right angled side wall of the groove 10a while at the opposite side 18a" it is beveled as shown, for a reason to be explained further below.

The ring 18 is further formed with a circular recess 18b for snugly receiving gasket 20.

The outer contour of the ring 18 has a cone-shape surface 18c, preferably between 15° and 30°, merging with an upright shoulder 18d.

Finally, the ring 18 is split by a cut 18e, for enabling the spreading or expansion thereof to an extent allowing it to be forced over the open side of the pipe 10 and pushed further until the rib 18a clicks into the groove 10a.

The gasket 20, usually of rubber or other suitable elastomeric material, is preferably formed with an inner slot 20a for its expansion under the pressure of the flowing through liquid as known in the art ("hydraulic seal").

The mounting flange 22 has an inner cone-shaped surface 22a of the same inclination and length as of the surface 18c of the ring 18, so that when the bolts 14 are tightened, a firm grip around the ring 18 is achieved along with an axially directed force component acting against the shoulder 18d, as requested for sealing the gasket 20 against the face of the flange 12 in the assembled position of the coupling.

Figure 4:
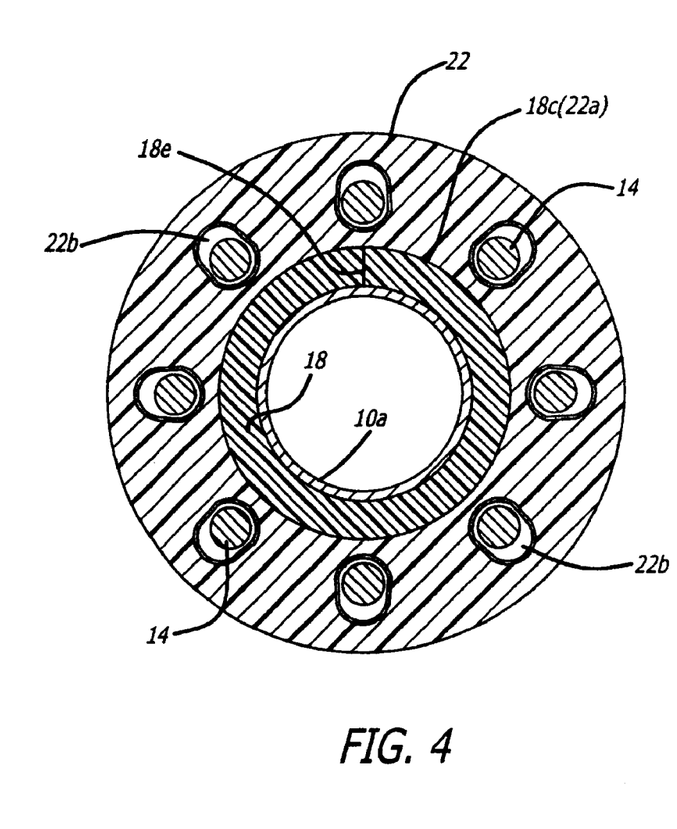
FIG. 4 is a sectional view taken along line IV-IV of FIG. 1.

The flange 22, with bores 22b for the bolts 14, is preferably formed with arcuate projections 22c compensating the width of the shoulder 18c.

The manner of assembling the coupling is self-evident in view of the foregoing description. As seen in FIG. 5, the flange 22 is first placed over the pipe 10. Then the mounting split ring 18 is forcibly dressed over the end of the pipe, which is facilitated by the elastic expansion assisted by the beveled portion 18a" of the rib 18a.

Once properly seated over the pipe 10, namely that the rib 18a grips around the groove (10a), the gasket 20 is placed into the recess 18b, and the flange 22 is dragged over the ring 18 in the direction of the flange 12 to which it is intended to be fastened.

The counter-force requested to withstand the tightening of the flanges 12 and 22 to each other using the bolts 14, thereby squeezing of the gasket 20 to a proper amount, is offered by the rib 18a trapped within the groove 10a, or, more accurately, the abutment of the portion 18a' against the upright wall of the groove 10a.

Figure 6:
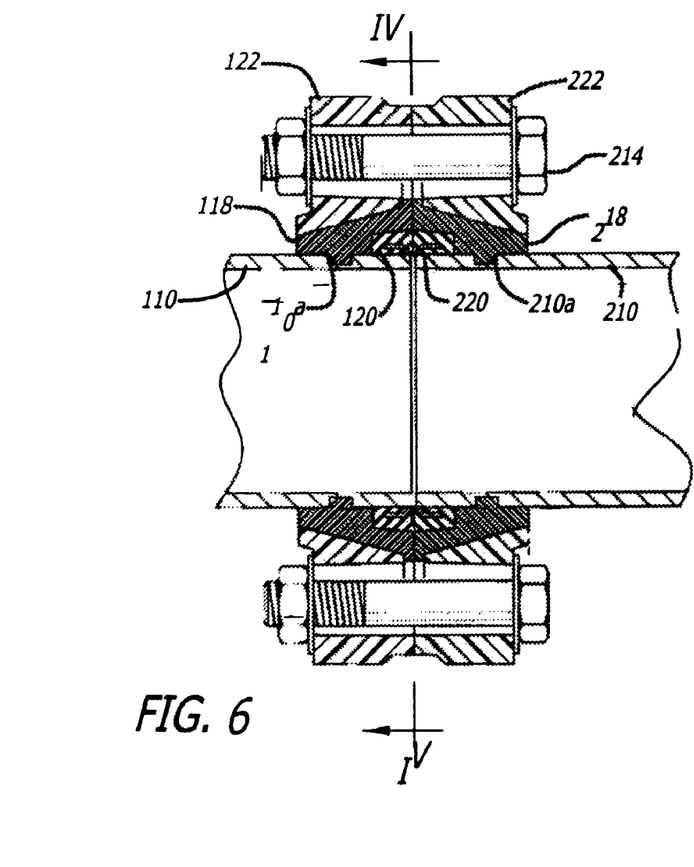
FIG. 6 is a cross-sectional view of a pipe coupling according to another embodiment of the invention used for connecting together a pair of pipes.
Figure 7:
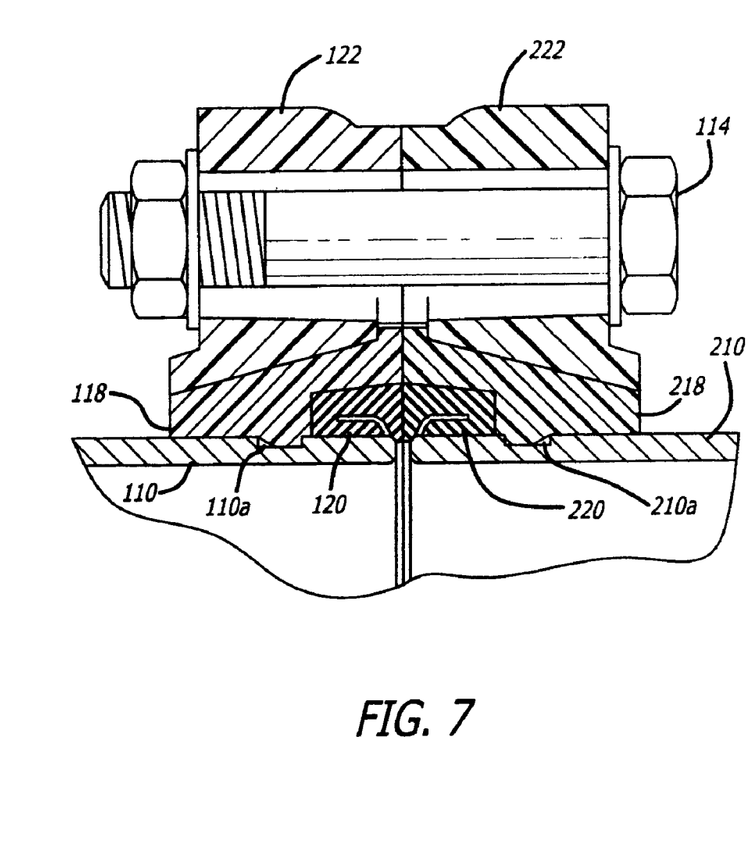
FIG. 7 shows a detail of the coupling of FIG. 6 on an enlarged scale.

The coupling substantially as so far described is readily useful for connecting two pipes of equal (or even unequal) diameters, as depicted in FIGS. 6 and 7, where similar reference numerals are used to denote already identified parts and components. As illustrated pipe 110 includes circumferential grooves 110a and 210a. Bolts 114 and 214 form a grip around the ring 118 when tightened.

As clearly seen, two couplings are employed, in a "face-to-face" engaging relationship. Hence, the left-hand side pipe 110 is assembled with mounting split ring 118, gasket 120 and mounting flange 122, which is tightened to flange 222, surrounding split ring 218 and gasket 220 (rather than to the fixed flange 12 as in the previous embodiment). Thus, the pipe 110 becomes sealingly connected to the pipe 210.

Several modified embodiments will be now described, demonstrating the versatility and other advantages of the present invention.

Figure 8:
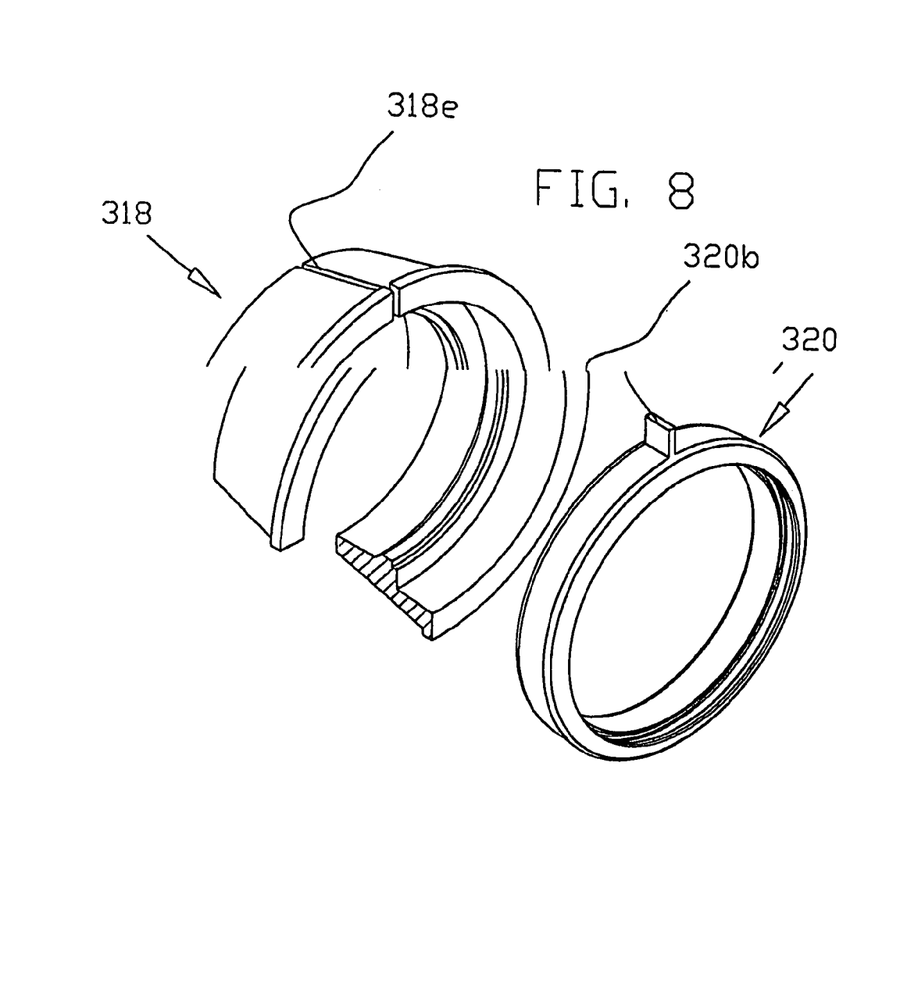
FIG. 8 illustrates a modified elastomeric gasket.

Referring to FIG. 8, there is exemplified a gasket 320 provided with a thin flap or tongue 320b designed to be inserted into slot 318e of the split ring 318. The positioning of the flap between the ring sections will add some flexibility that will compensate for any deviation of measurement or surface irregularities between the ring and the surrounding mounting flange (not shown), allowing less stringent tolerance control during production.

Figure 9:
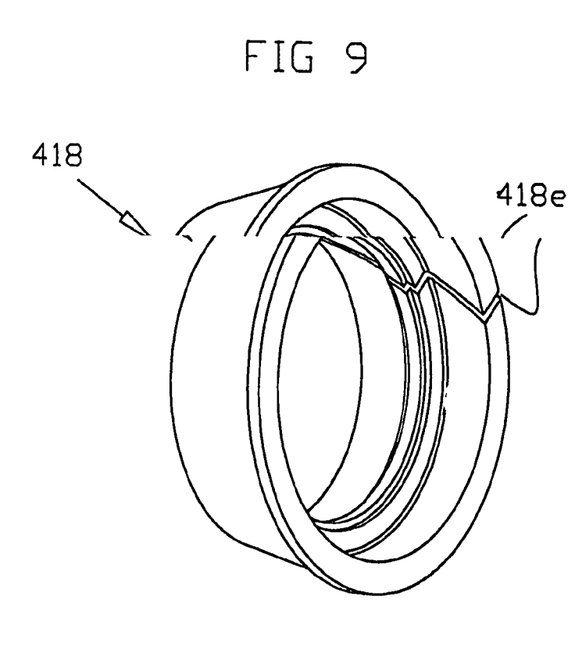
FIG. 9 illustrates a modified mounting split ring.

The mounting split ring 418 of FIG. 9 is formed with a cut-through slot 418e extending at an angle with respect to axial direction.

Figure 10:
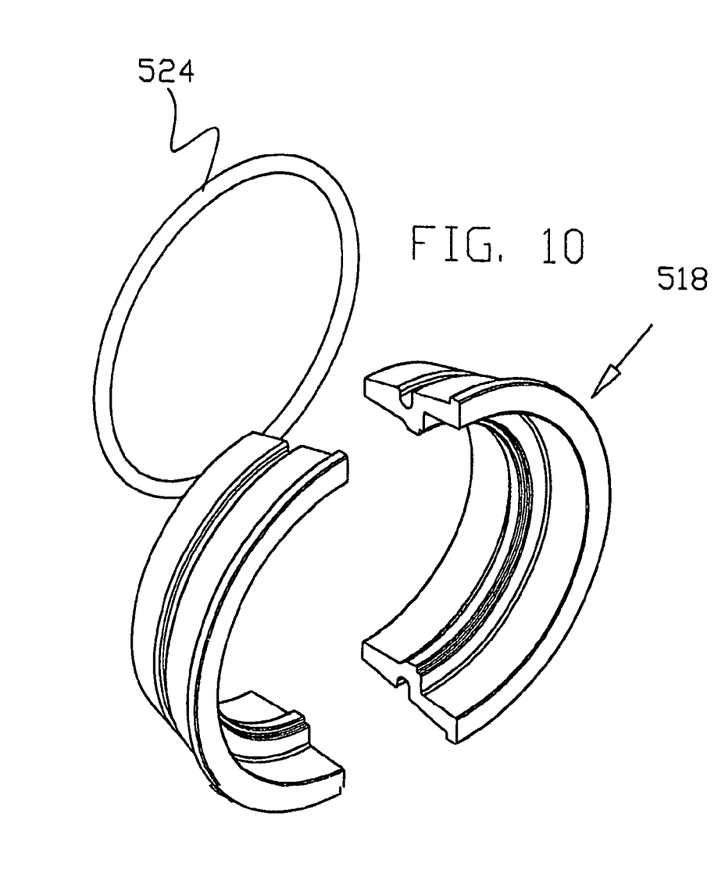
FIG. 10 illustrates a further modification of the mounting split ring.
Figure 11:
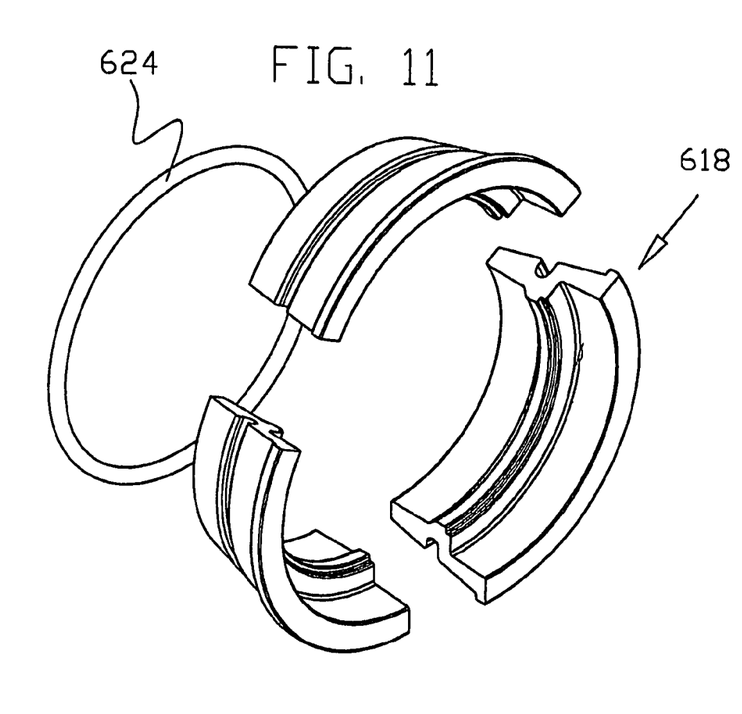
FIG. 11 is a modification of the ring of FIG. 10.

Rather than employing a split ring, it is possible to have it composed of more than one segment (two segments in ring 518 in FIG. 10 and three in ring 618 in FIG. 11), held together by a rubber band (524 and 624, respectively).

The mounting ring 718 of FIGS. 12-14 is again of a modified design. A series of metal inserts 726 are positioned between the segments. An elastic band 728 is threaded through all segments and inserts enabling the expansion of the ring 718 as requested for the mounting thereof over a pipe (not shown). The inserts conform the shape of the mounting ring as dictated for its use, namely with teeth 718a (replacing the continuous rib 18a of FIG. 1) and the cone-shaped outer surface 718c.

Figure 12:
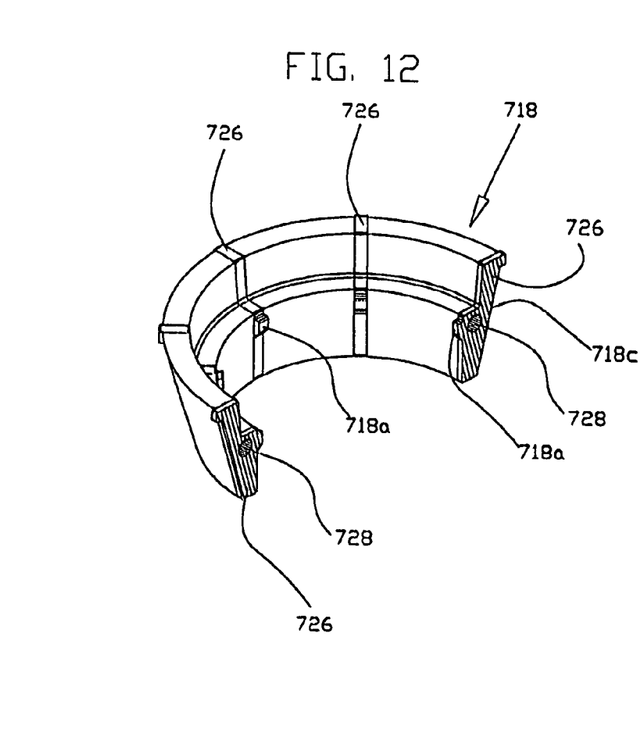
FIG. 12 is a perspective view of a mounting ring of a hybrid, multi-segment structure.
Figure 13:
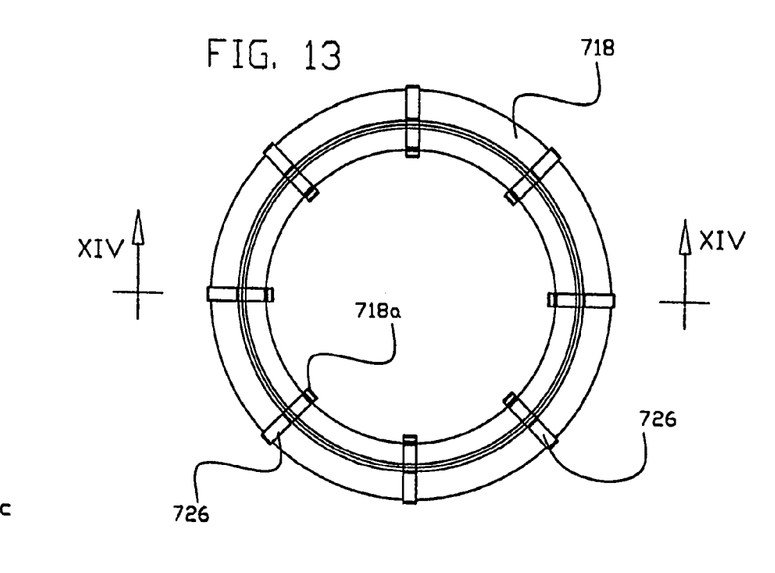
FIG. 13 is a top view of ring of FIG. 12.
Figure 14:
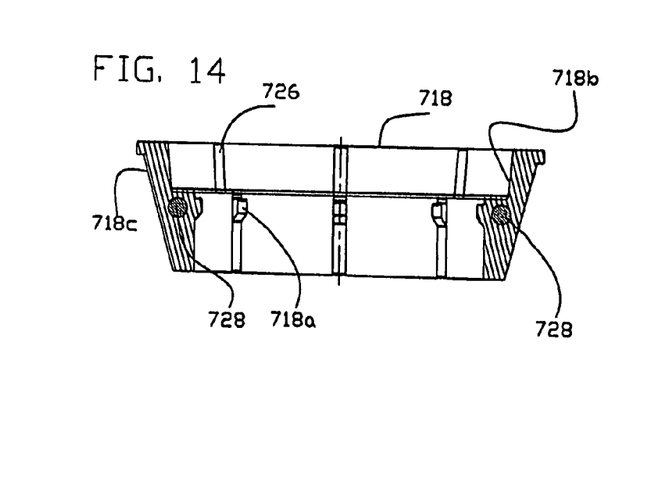
FIG. 14 is a sectional view taken along line XIV-XIV of FIG. 13.

The hybrid or composite structure of the ring 718 offers enhanced firm grip of the ring against the grooved pipe (not shown), as well as electrical short-cut between coupled pipes in case such is demanded.

Figure 15:
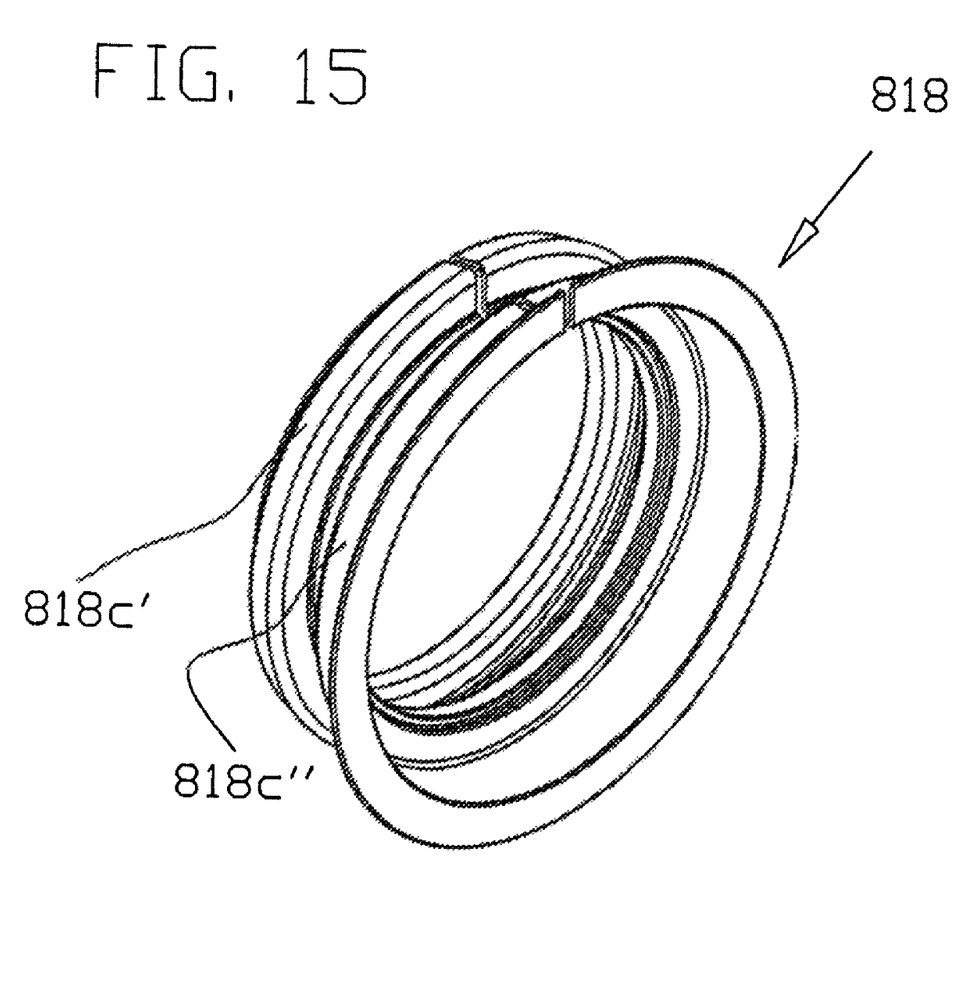
FIG. 15 shows a mounting split ring worked out of sheet metal.

The mounting ring 818 of FIG. 15 is produced not by plastic molding, but of sheet metal processed by known technologies (rolling) to the final shape. It will be noted that the continuous cone-shaped surface (denoted 18c in FIG. 2) is divided into two: portion 818c' and portion 818c" which together suitably support the inner cone-shaped surface of the mounting flange (not shown).

Those skilled in the art to which this invention pertains will readily appreciate that numerous changes, variations and modifications can be effectuated without departing from the true spirit and scope of the invention as defined in and by the appended claims.

What is claimed is:

1. A pipe coupling comprising:
   a single gasket,
   a resilient mounting ring made of a flexible material and having a split and
   a circular recess in said resilient mounting ring for receiving the gasket, and
   a mounting flange having a cone shaped inner surface, wherein the mounting ring is elastically expandable and is integrally formed with an outer cone-shaped surface, said outer cone-shaped surface complementary to said cone shaped inner surface, and with an inner rib, wherein the rib fits into a circumferential groove formed in a first pipe upon elastically expanding the ring over the first pipe to hold the ring affixed to the first pipe, wherein the pipe coupling connects the first pipe to a counter-flange associated with a second pipe in a sealed manner when the ring is tightened towards the counter-flange, whereby said single gasket abuts said first pipe and abuts said resilient mounting ring in use.

2. The pipe coupling as claimed in claim 1 wherein the ring is split by a cut extending in an axial plane thereof.

3. The pipe coupling as claimed in claim 1 wherein the ring is split by a cut extending in a non-axial plane thereof.

4. The pipe coupling as claimed in claim 1 wherein the ring is made of plastic material.

5. The pipe coupling as claimed in claim 1 wherein the inner rib comprises a circular rib.

6. The pipe coupling as claimed in claim 5 wherein the rib is of a generally saw-tooth shape having a right-angled side and a beveled side.

7. The pipe coupling as claimed in claim 1 wherein the gasket is elastomeric.

8. The pipe coupling as claimed in claim 7 wherein the gasket is formed with an inner slot.

9. The pipe coupling as claimed in claim 8 wherein the gasket is formed with a thin flap.

10. The pipe coupling as claimed in claim 1 wherein the cone angle is between 150-300 degrees relative to the axis of the ring.

11. The pipe coupling as claimed in claim 10 wherein an upright shoulder extends around the end of the outer cone-shaped surface.

12. The pipe coupling as claimed in claim 1 wherein the mounting flange is formed with a series of bores through which tightening bolts are adapted to pass.

13. The pipe coupling as claimed in claim 12 wherein the series of bores are partly surrounded by arcuate projections.

14. The pipe coupling as claimed in claim 1 wherein the ring is composed of more than one segment, the segments being held together by an elastic band.

15. The pipe coupling as claimed in claim 14 wherein metal inserts are interposed between adjacent segments.

16. The pipe coupling as claimed in claim 15 wherein the segments and inserts are held together by the elastic band threaded therethrough.

17. The pipe coupling as claimed in claim 1 wherein the ring is made of sheet metal.

* * * * *